(12) United States Patent
Jain

(10) Patent No.: US 9,996,352 B1
(45) Date of Patent: *Jun. 12, 2018

(54) ROM-CODE PROGRAMMABLE DIGITAL SIGNAL PROCESSOR

(71) Applicant: MARVELL INTERNATIONAL LTD., Hamilton (BM)

(72) Inventor: Kapil Jain, Santa Clara, CA (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 235 days.

This patent is subject to a terminal disclaimer.

(21) Appl. No.: 15/052,074

(22) Filed: Feb. 24, 2016

Related U.S. Application Data

(63) Continuation of application No. 13/533,019, filed on Jun. 26, 2012, now Pat. No. 9,274,801.

(60) Provisional application No. 61/502,778, filed on Jun. 29, 2011, provisional application No. 61/560,721, filed on Nov. 16, 2011.

(51) Int. Cl.
*G06F 9/30* (2018.01)

(52) U.S. Cl.
CPC ...... *G06F 9/30101* (2013.01); *G06F 9/30058* (2013.01)

(58) Field of Classification Search
None
See application file for complete search history.

(56) References Cited

U.S. PATENT DOCUMENTS

| 5,721,945 A * | 2/1998 | Mills ............ G06F 9/30145 700/2 |
| 5,892,934 A | 4/1999 | Yard |
| 6,032,247 A | 2/2000 | Asghar et al. |

\* cited by examiner

*Primary Examiner* — Corey S Faherty

(57) ABSTRACT

Systems, methods, and other embodiments associated with a processor that includes selectively enabled features are described. According to one embodiment, a processor includes a plurality of processing routines embedded within the processor that when executed cause the processor to implement corresponding processor features. The processor includes a processor engine configured to determine whether a processing routine of the plurality of processing routines is enabled based, at least in part, on a corresponding value in a control register. The processing engine is configured to selectively execute the processing routine based, at least in part, on whether the value indicates that the processing routine is enabled.

20 Claims, 5 Drawing Sheets

ROM-CODE PROGRAMMABLE DIGITAL SIGNAL PROCESSOR

CROSS REFERENCE TO RELATED APPLICATIONS

This patent disclosure is a continuation of U.S. patent application Ser. No. 13/533,019 filed Jun. 26, 2012, now U.S. Pat. No. 9,274,801, which claims the benefit of U.S. Provisional Application No. 61/502,778 filed on Jun. 29, 2011 and U.S. Provisional Application No. 61/560,721 filed on Nov. 16, 2011, which are both hereby wholly incorporated by reference.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

A digital signal processor (DSP) is a type of processor that performs specific routines to process digital signals. DSPs are often adapted to efficiently perform specific routines on a particular type of digital signal. For example, a DSP may be designed for filtering and generating digitized analog signals in a modem. Another DSP may be designed for processing signaling information in an electronic telephone switching system. In either case, an architecture of each DSP is designed to promote increased efficiency with the respective specific routines. A DSP may have an architecture with specialized registers and arithmetic circuits tailored for the specific routines. Such an architecture improves processing efficiencies for the specific routines, but also limits the DSP from performing a wide array of routines. In general, this results in a different DSP being designed and manufactured for each different set of routines. Designing and manufacturing multiple different DSPs can be costly.

By contrast, an architecture of a generalized processor is designed with general purpose registers and arithmetic circuits for processing a wide array of processing routines. For example, while a DSP may only process audio signals, a generalized processor may perform text editing, spreadsheet processing, graphics processing, audio processing, and so on. A generalized architecture permits processing of these different types of routines, but the generalized architecture is less efficient. This reduced efficiency occurs due to components being designed to handle the wide array of routines instead of being designed to efficiently handle just a few routines. In summary, when designing and implementing a processor (e.g., DSP or general processor) tradeoffs occur based on robust processing abilities, costs, and processing efficiency.

SUMMARY

In general, in one aspect this specification discloses a processor. The processor includes a plurality of processing routines embedded within the processor that when executed cause the processor to implement corresponding processor features. The processor includes a processor engine configured to determine whether a processing routine of a plurality of processing routines is enabled based, at least in part, on a corresponding value in a control register. The processing engine is configured to selectively execute the processing routine based, at least in part, on whether the value indicates that the processing routine is enabled.

In general, in another aspect, this specification discloses a method for selectively enabling features of a processor. Each of the features corresponds to one of a plurality of processing routines. The method includes determining, by the processor, whether a value of a control register indicates that a processing routine of the plurality of processing routines corresponding with the value of the control register is enabled. The method includes executing, by the processor, the processing routine based, at least in part, on whether the value indicates that the processing routine is enabled.

In general, in one aspect this specification discloses a processor. The processor includes a memory embedded within the processor and storing a plurality of processing routines. The processor includes a control register storing a set of values that i) each correspond to a different processing routine of the plurality of processing routines, and that ii) indicate whether a corresponding one of the plurality of processing routines is activated.

BRIEF DESCRIPTION OF THE DRAWINGS

The accompanying drawings, which are incorporated in and constitute a part of the specification, illustrate various systems, methods, and other embodiments of the disclosure. The illustrated element boundaries (e.g., boxes, groups of boxes, or other shapes) in the figures represent one example of the boundaries. In some examples one element may be designed as multiple elements or multiple elements may be designed as one element. In some examples, an element shown as an internal component of another element may be implemented as an external component and vice versa. Furthermore, elements may not be drawn to scale.

DETAILED DESCRIPTION

Described herein are examples of systems, methods, and other embodiments associated with a digital signal processor (DSP) configured with a read-only memory (ROM). In one embodiment, the ROM is fabricated in a chip within a single mask layer to simplify the process of redesigning and remanufacturing revised versions of the DSP that change only processing routines of the ROM. In another embodiment, the DSP is designed to selectively execute processing routines of the ROM. In this way, the DSP is designed with an efficient architecture and still provides a robust set of processing routines that can be selectively implemented for different end users.

Figure 1:
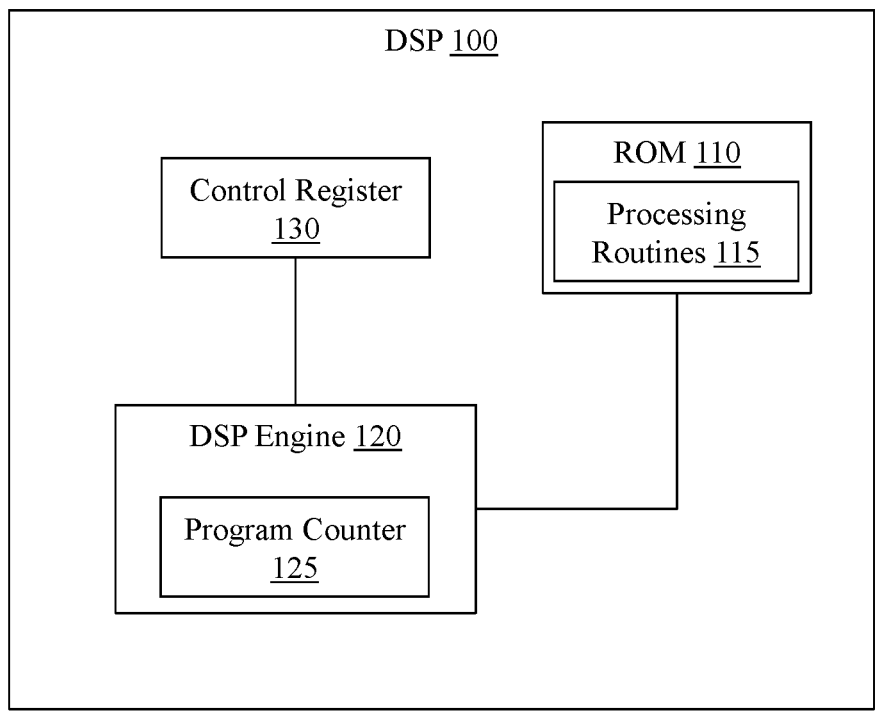
FIG. 1 illustrates one embodiment of a digital signal processor configured with a read-only memory.

FIG. 1 illustrates one embodiment of a digital signal processor (DSP) 100. The DSP 100 includes a ROM 110 with processing routines 115, a DSP engine 120 with a program counter 125, and a control register 130. The ROM 110 is configured with sequentially addressable instructions used by the DSP engine 120 to implement various processing features. The ROM 110 includes the instructions as the processing routines 115. In one embodiment, the ROM 110 is a mask ROM. A mask ROM is a type of read-only memory that is fabricated into an integrated circuit (e.g., DSP 100) and is not re-writable. Accordingly, because the ROM 110 is a mask ROM (according to one embodiment), the processing routines 115 are fabricated into the ROM 110 during the manufacturing of the DSP 100.

By fabricating the ROM 110 with the processing routines 115, the DSP 100 operates more efficiently and can be manufactured at a reduced cost. This is because, for example, the mask ROM operates more quickly and consumes less area than other types of memory. However, the processing routines 115 cannot be modified after the DSP 100 is manufactured because a mask ROM is a printed circuit where the processing routines 115 are integrated as permanent features. To overcome the inability to modify the processing routines 115 after the DSP 100 is manufactured, one embodiment of the present design of the DSP 100 is configured to simplify modification of the ROM 110 in future versions of the DSP 100.

For example, a design of the DSP 100 includes the ROM 110 as a single mask layer out of many mask layers that makeup the DSP 100. As such, all the processing routines 115 that are part of the ROM 110 are also implemented into only the single mask layer and are not contained in other layers. In this way, manufacturing a revised version of the DSP 100 with processing routines that are different from the original processing routines 115 can occur at a reduced cost and with less difficulty because only the single mask layer that corresponds with the ROM 110 can be replaced during the manufacturing process without changing the other layers.

Designing the ROM 110 as a single mask layer avoids difficulties with having the ROM 110 and the processing routines 115 designed across multiple layers in the integrated circuit. For example, a redesign would require redesigning multiple mask layers to change the effected processing routines as well as other components that share the same mask layers. Then multiple layers in the integrated circuit would have to be refabricated during the manufacturing process, which is more costly.

For example, manufacturing the DSP 100 involves fabricating the DSP 100 from many (e.g., twenty or more) separate mask layers in a photolithography process. Each of the mask layers defines a specific step in the manufacturing process of the DSP 100. Additionally, each of the mask layers include, for example, different components, portions of the components, and connections between the components that makeup the DSP 100. Thus, if the ROM 110 where to occupy many different layers, each layer that the ROM 110 occupies would need to be redesigned along with connections to components on those layers and, in some cases, even the components themselves.

Thus, the DSP 100 is designed so that the ROM 110 occupies a single mask layer in order to avoid the need to redesign multiple mask layers when changing the processing routines in the ROM 110. Using a single mask layer for the ROM 110 permits a different version of the DSP 100 to be more easily designed and manufactured. For example, a different version of the DSP 100 may include processing routines that are added, removed, or modified from the previous version of the processing routines 115. However, other components (e.g., DSP engine 120) of the DSP 100 and other mask layers associated with the other components may be unaffected by the change and thus do not need to be revised. Because the other components and the other mask layers are unaffected by revisions to the ROM 110, only a portion of the single mask layer with the ROM 110 is redesigned.

Now, briefly consider the processing routines 115. In one embodiment, the processing routines 115 are composed of instructions that are used by the DSP engine 120 to perform various functions. The instructions are designed to control different components of the DSP engine 120 and to cause the DSP engine 120 to perform specified actions. The instructions implemented by the DSP engine 120 permit the ROM 110 to be programmed with many different processing routines while still efficiently processing input data. For example, a design of the DSP engine 120 includes application specific components that support many different instructions. Having a variety of instructions permits many different processing routines to be programmed into the ROM 120 during manufacturing.

As examples, which are not intended to be limiting, the application specific components may be designed to perform a variety of processing routines using the instructions like processing audio and/or video signals. The application specific components of the DSP engine 120 can include a multiply and accumulate unit (not shown) for processing audio signals. The DSP engine 120 can also include an arithmetic logic unit (ALU) (not shown) that is designed for a specific type of digital signal (e.g., audio) to be processed. However, the types of components of the DSP engine 120 are not the focus of the disclosure and will not be discussed in detail.

In addition to the application specific components, in one embodiment, the DSP engine 120 includes the program counter 125 that indicates a current location in a processing sequence while executing instructions. The program counter 125 operates by incrementing a value after an instruction is fetched from the ROM 110. In this way, the program counter 125 controls the DSP engine 120 to sequentially progress through instructions in the ROM 110 during execution.

In one embodiment, a subset of the processing routines 115 can be implemented according to values programmed in the control register 130. This can be achieved by using the program counter 125 with conditional jump instructions placed into the processing routines. The conditional jump instructions reference the values in the control register 130 to implement only a subset of the processing routines 115 that are enabled. In other words, the conditional jump instructions can control which instructions are skipped (e.g., not executed since the routine is disabled) and thus which instructions may be executed during execution.

After the DSP 100 is manufactured, the control register 130 is programmed with the values by a manufacturer. Each value of the control register 130 corresponds with a different one of the processing routines 115 and specifies whether the corresponding processing routine is enabled or disabled. In one embodiment, the values of the control register 130 are locked and cannot be changed once programmed. Thus, the DSP 100 can be controlled to selectively implement a selected subset of the processing routines 115. In this manner, the DSP 100 can be customized for an end user by using the control register 130 and the conditional jump instructions to specify which routines the end user is permitted to execute (enabled routines) and which routines cannot be executed (disabled routines). In another embodiment, the control register 130 is unlocked and remains programmable by an end user. In this way, the end user can modify values in the control register 130 to change which of the processing routines 115 are enabled. For example, the processing routines 115 that are enabled can be changed over time at the end user's desire or the processing routines 115 that are enabled can be changed automatically by a control routine.

Selectively enabling the processing routines permits the ROM 110 to be configured with a robust assortment of processing routines 115. The manufacturer can design a single ROM 110 with many different processing routines, but only enable those processing routines applicable to a specific end user. Thus, instead of redesigning a mask layer for the ROM 110 and remanufacturing the DSP 100 for each end user, the ROM 110 can be programmed with processing routines that are selectively enabled or disabled. In this way, different sets of processing features can be provided to different end users instead of manufacturing different DSPs with different ROMs.

As an example, consider that the ROM 110 is configured with processing routines a, b, c, and d. By programming values in the control register 130, a first DSP 100 can be configured to implement, for example, processing routines a, b, and d, while another DSP 100 can be configured to implement processing routines a and c. Thus, by simply programming the control register 130 with values corresponding to the different processing routines, different sets of features of the DSP 100 can be implemented using the same ROM 110.

Figure 2:
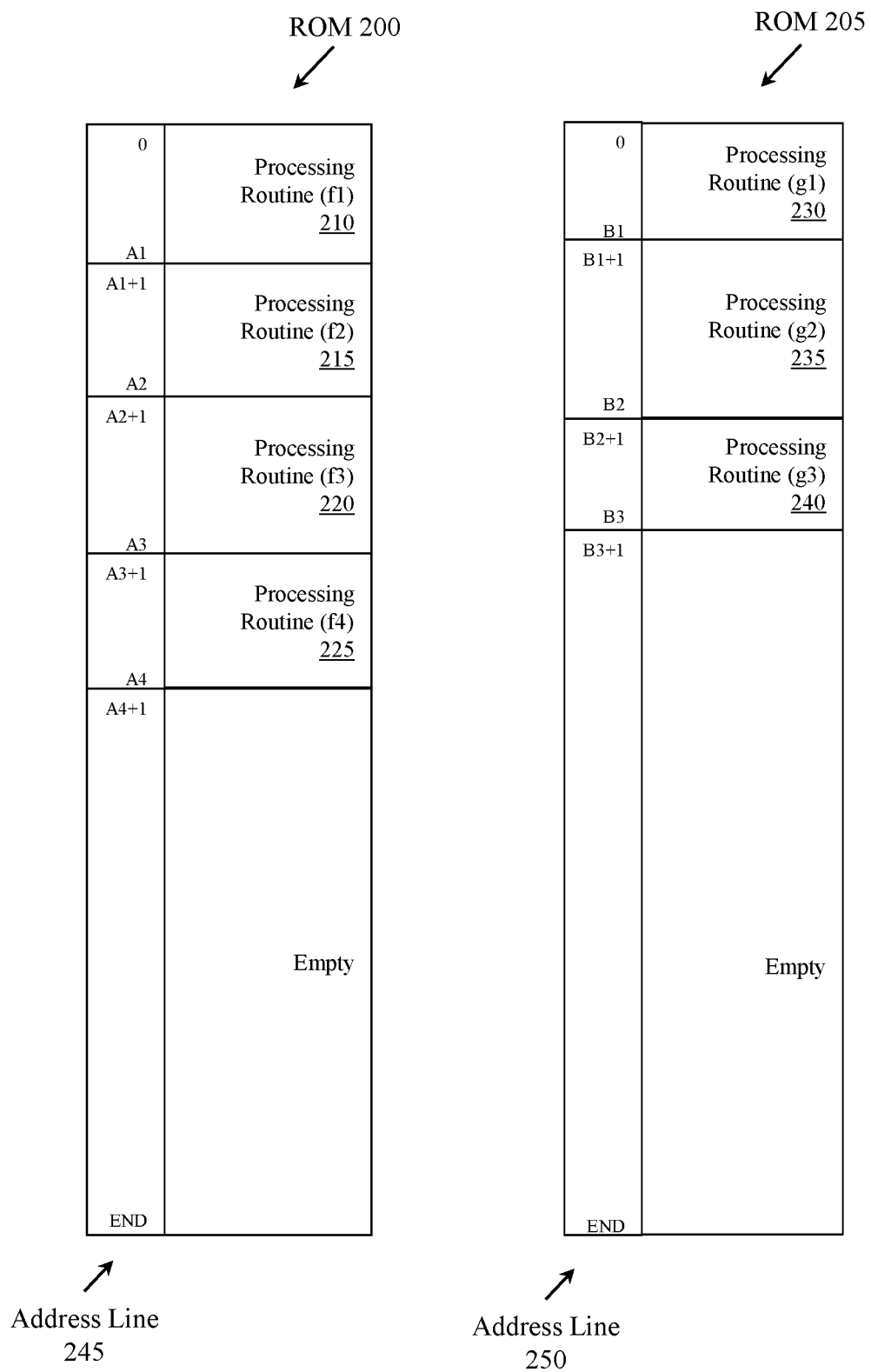
FIG. 2 illustrates two separate embodiments of a read-only memory configured with multiple processing routines.

Now, consider example ROMs 200 and 205 as illustrated in FIG. 2. The ROMs 200 and 205 will be discussed in conjunction with the DSP 100 of FIG. 1. The ROMs 200 and 205 represent ROMs from separate fabrication processes with different mask layers. The ROMs 200 and 205 do not include the conditional jump instructions used to selectively execute different subsets of processing routines. Selectively executing subsets of the processing routines 115 will be discussed in greater detail with FIG. 3. For now, consider that the ROM 200 is manufactured from a first mask layer and the ROM 205 is manufactured from a second mask layer. The ROM 200 includes four processing routines, f1 210, f2 215, f3 220, and f4 225. The ROM 205 includes three processing routines, g1 230, g2 235, and g3 240. Each of the processing routines corresponds to a separate processing feature implemented by the DSP 100.

In FIG. 2, the ROMs 200 and 205 correspond with two different versions of the DSP 100 that can be produced. One version of the DSP 100 is manufactured with the ROM 200 and another version of the DSP 100 is manufactured with the ROM 205. Further consider that the DSP 100 is an audio DSP that processes, for example, music, speech, and other audio signals. Thus, the ROMs 200 and 205 may include different sets of processing routines for DSPs used in different audio processing applications. In one example, f1 210 is a 5-band equalizer processing routine, f2 215 is a noise cancellation processing routine, f3 220 is an echo cancellation processing routine, f4 225 is a dynamic range compression processing routine. Additionally, g1 230 is a 3-band equalizer processing routine, g2 235 is a loudness compensation processing routine, and g3 240 is a 3-D sound processing routine.

Address lines 245 and 250 sequentially address each line in the ROMs 200 and 205, respectively. Each address line corresponds to a single instruction. The program counter 125 of FIG. 1 is sequentially incremented to step through instructions of the processing routines as addressed by the address lines 245 and 250. For example, the processing routine f1 210 is addressable from line 0 to line A1. The program counter 125 is sequentially incremented from 0 to A1 when the DSP 100 is executing the processing routine f1 210. Accordingly, the processing routines of the ROMs 200 and 205 are executed in sequence. In a DSP including the ROM 200, the processing routine f1 210 is executed first followed by processing routines f2 215, f3 220, and finally f4 225. This is because there are no conditional jump instructions in the ROM 200. After the processing routine f4 225 is executed, the program counter 125 is reset and execution begins again with the processing routine f1 210 on a new set of input data.

Figure 3:
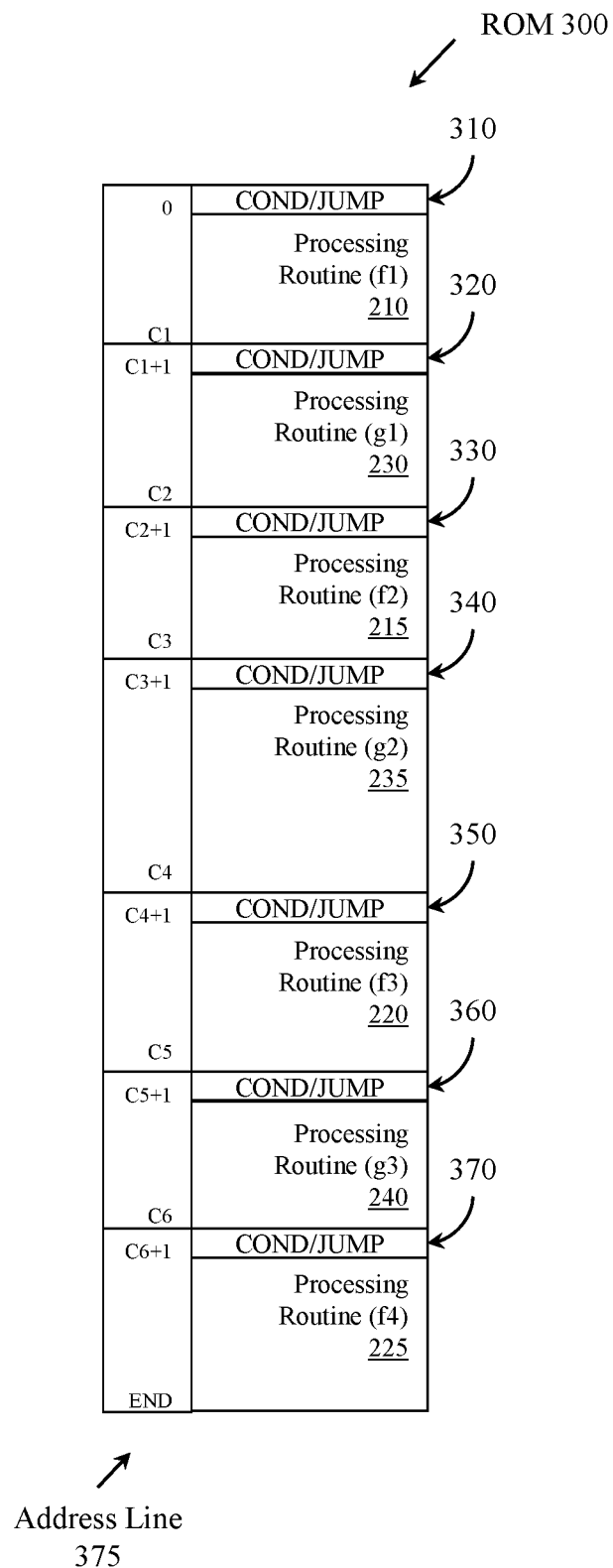
FIG. 3 illustrates one embodiment of a read-only memory that includes conditional jump instructions for selectively implementing processing routines.

In contrast to the previously described ROMs 200 and 205 of FIG. 2, now consider ROM 300 of FIG. 3. The ROM 300 includes processing routines from the ROM 200 and the ROM 205 (e.g., f1, f2, f3, f4, g1, g2, g3). Additionally, just as with the ROMs 200 and 205, the ROM 300 is manufactured from a single mask layer. However, contrary to the ROMs 200 and 205, the ROM 300 also includes a conditional jump instruction (e.g., 310, 320, 330, 340, 350, 360, and 370) prior to each of the processing routines. The conditional jump instructions permit selective execution of the processing routines (e.g., f1, f2, f3, f4, g1, g2, g3). Each of the conditional jump instructions references a different value in the control register 130. Similarly, each value in the control register 130 corresponds to a different processing routine/conditional jump instruction.

Only processing routines of the ROM 300 that are enabled as controlled by the control register 130, are executable. Accordingly, the ROM 300 can mimic the ROMs 200 and 205 of FIG. 2 by enabling either the routines from the ROM 200 or the routines from the ROM 205 as controlled by the values of the control register 130. Additionally, combinations different from those of the ROMs 200 and 205 can also be implemented depending on how the control register 130 is programmed.

For example, consider that the ROM 300 is implemented with the DSP 100 of FIG. 1. The DSP engine 120 begins execution by retrieving a first instruction from the ROM 300. In the ROM 300, the first instruction is the conditional jump instruction 310. The DSP engine 120 checks a value in the control register 130 that corresponds with the processing routine f1 210. If the value in the control register 130 that corresponds to the processing routine f1 210 indicates that the routine f1 210 is enabled, then the DSP engine 120 proceeds by executing the processing routine f1 210. However, if the value of the control register 130 indicates that the routine f1 210 is disabled, then the DSP engine 120 jumps to the next processing routine g1 230. For the conditional jump 320, a corresponding value in the control register 130 is checked and processing continues as described with conditional jump 310. The same process occurs for each conditional jump until the end of the ROM 300 is reached. After the end of ROM 300 is reached, processing begins again at the beginning of the ROM 300 with address line 0 and new input data.

When a jump occurs, the program counter 125 of FIG. 1 is incremented by a value that equals a number of instructions in a processing routine that is jumped. For example, if the processing routine f1 210 is disabled, then the program counter 125 is incremented by a value (e.g., C1+1) that is sufficient to jump a number of instructions in the processing routine f1 210. As illustrated in address line 375, C1 is a number of instructions that make up the processing routine f1 210. By incrementing the program counter 125 in this way, the DSP engine 120 can seamlessly jump disabled routines and implement a subset of the processing routines in the ROM 300.

While the ROM 300 is illustrated as including a conditional jump instruction prior to each processing routine, in other embodiments, conditional jump instructions can be included before only certain processing routines or even part way through a processing routine. Consider a circumstance where a conditional jump instruction is not included before each processing routine. In this example, the program counter 125 may be incremented by a value to jump multiple processing routines or just the single processing routine.

In another example, consider a circumstance where the conditional jump 320 is not present. In one embodiment, the processing routine g1 230 may be a critical processing routine that is always executed. Thus, if f1 210 is disabled, then the conditional jump 310 would increment the counter by a value e.g., C1+1. Since no conditional jump instruction exists at 320, routine g1 230 is always executed. Alternatively, if the processing routine g1 230 is a processing routine that complements and must occur with the processing routine f1 210, then the conditional jump would increment the program counter by a value e.g., C2+1 in order to jump both routines f1 210 and g1 230, if disabled.

In other embodiments, conditional jump instructions can be included, for example, part way through a processing routine. Consider an example where both a 3-band equalizer and a 5-band equalizer are programmed in the ROM 300. Further consider that the 5-band equalizer shares the same code for the first 3-bands with the 3-band equalizer. Thus, a conditional jump instruction can be placed after the code for the 3-band equalizer but before the remaining code to implement the 5-band equalizer. Thus, the conditional jump instruction placed in the middle of the code after the 3-band portion of the 5-band equalizer routine permits the DSP 100 to jump a portion of the remaining code. In this way, space can be saved in the ROM 300 by reducing redundant code and combining routines that share identical code.

Figure 4:
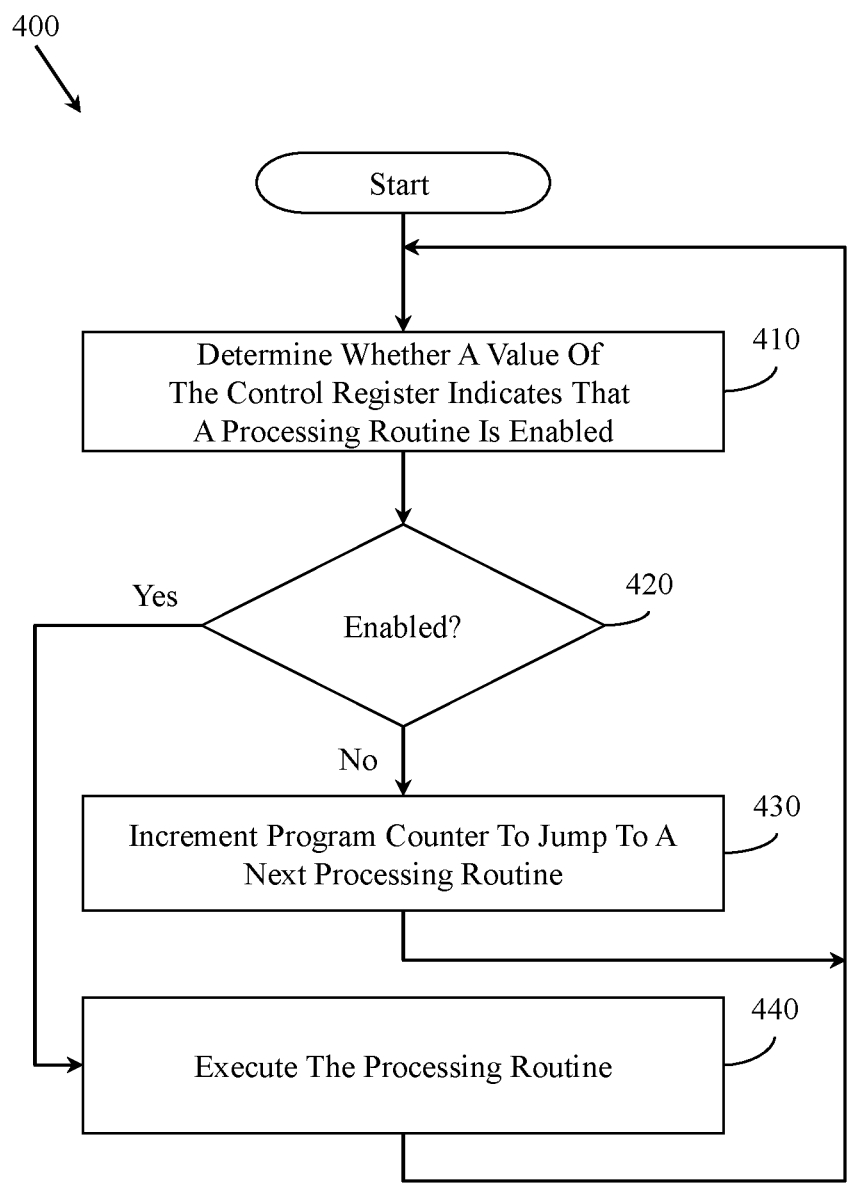
FIG. 4 illustrates one embodiment of a method associated with selective execution of processing routines in a read-only memory.

Further details of the DSP 100 and the ROM 300 will be discussed in conjunction with FIG. 4. FIG. 4 illustrates a method 400 associated with a DSP (e.g., DSP 100) that uses a control register (e.g., control register 130) to selectively enable processing features stored in a ROM (e.g., ROM 110). FIG. 4 is discussed from the perspective that the method 400 is implemented and performed by the DSP 100 of FIG. 1.

The method 400 begins at 410 by determining if a value of the control register 130 indicates that a corresponding processing routine is enabled. For example, the DSP engine 120 uses a current value of the program counter 125 to determine which value in the control register 130 corresponds to a current processing routine. Once the correct value is identified, the DSP engine 120 determines whether the value is, for example, a "1" for enabled or a "0" for disabled. Of course, other values can be used.

At 420, if the corresponding value of the control register 130 indicates that the processing routine is enabled, then the method 400 proceeds to 440 where the processing routine is executed. Executing the processing routine includes, for example, performing instructions of the processing routine on input data received in the DSP 100. As previously discussed, the processing routine may be an audio processing routine (e.g., 5-band equalizer, noise cancellation, and so on) that includes many different instructions.

At 420, if the corresponding value of the control register 130 indicates that the processing routine is disabled, then the program counter 125 is incremented by a value that causes the DSP 100 to jump to the next processing routine. The method 400 then repeats for the next conditional jump instruction.

The DSP 100 continuously performs the method 400 while executing the enabled processing routines in the ROM 110. The processing routines that are enabled may be performed for each set of input data received by the DSP 100. For example, the DSP 100 receives digital signals as an input. The digital signals can be buffered and then processed by the DSP 100 using the enabled processing routines from the ROM 110. In this way, the DSP 100 can produce processed digital signals for use by another device, for transmission, and so on.

Figure 5:
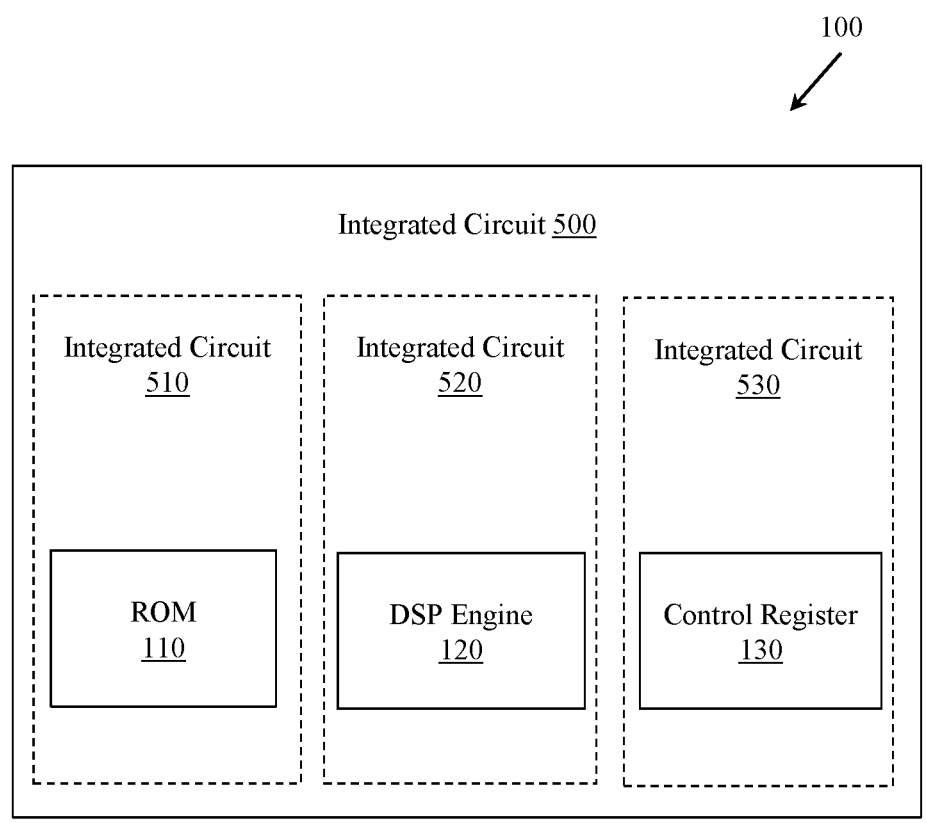
FIG. 5 illustrates one embodiment of an integrated circuit associated with a digital signal processor.

FIG. 5 illustrates an additional embodiment of the DSP 100 from FIG. 1 that is configured with separate integrated circuits and/or chips. In this embodiment, the DSP engine 120 from FIG. 1 is embodied as a separate integrated circuit 520. Additionally, the ROM 110 is embodied on an individual integrated circuit 510 (e.g., in a separate mask layer in the integrated circuit 500). The control register 130 is also embodied on an individual integrated circuit 530. The circuits are connected via connection paths to communicate signals. While integrated circuits 510, 520, and 530 are illustrated as separate integrated circuits, they may be integrated into a common circuit board or chip 500. Additionally, integrated circuits 510, 520, and 530 may be combined into fewer integrated circuits or divided into more integrated circuits than illustrated. In other embodiments, portions of the functionality associated with the DSP engine 120 may be embodied as executable code stored in the ROM 110.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes but is not limited to hardware, firmware, instructions stored on a non-transitory medium or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics. One or more of the components and functions described herein may be implemented using one or more of the logic elements.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

What is claimed is:

1. A processor, comprising:
   a plurality of processing routines embedded within the processor, wherein each of the processing routines includes a corresponding set of instructions executable by the processor;
   a control register configured with a plurality of values, wherein each value (i) is assigned to one routine from the plurality of processing routines and (ii) indicates whether the routine assigned to the value is enabled or disabled;
   wherein one or more of the plurality of processing routines is associated with a conditional jump instruction that is executed prior to execution of the set of instructions of the corresponding processing routine;
   wherein each conditional jump instruction is configured to refer to a corresponding value in the control register that is assigned to the processing routine; and
   wherein upon the processor executing conditional jump instructions, the conditional jump instructions (i) control which instructions from the plurality of processing routines are executed based at least on the value from the control register indicating that a given routine is enabled, and (ii) control which instructions from the plurality of processing routines are skipped and not executed if the value from the control register indicates that a given routine is disabled.

2. The processor of claim 1, wherein the plurality of processing routines are embedded within an integrated circuit of the processor in a single mask layer of the processor, wherein the processor includes a plurality of mask layers.

3. The processor of claim 1, wherein the plurality of processing routines are pre-programmed into the processor during a manufacturing process, and wherein the plurality of processing routines are fixed and not re-programmable.

4. The processor of claim 1, wherein the plurality of processing routines are selectively enabled according to corresponding values in the control register, wherein the control register is programmed with the values to enable a selected set of the plurality of processing routines, and wherein the values programmed into the control register are permanently programmed to prevent the values from being changed.

5. The processor of claim 1, wherein the plurality of routines are programmed onto a single mask layer of a design for the processor to separate the plurality of routines from remaining portions of the design.

6. The processor of claim 1, wherein the processor includes an engine configured to determine whether the corresponding value of the control register for the processing routine indicates that the processing routine is enabled by using a value of a program counter to index the control register.

7. The processor of claim 1, wherein the processor is further configured to jump execution of a first processing routine within the plurality of processing routines of the processor when the first processing routine is not enabled as indicated by the value in the control register assigned to the first processing routine, wherein the jump occurs by incrementing a program counter to an address of a second processing routine of the plurality of processing routines to cause the processor to skip over the first processing routine, and wherein the plurality of processing routines are sequentially addressable and the second processing routine occurs after the first processing routine.

8. A method for selectively enabling features of a processor, wherein each of the features corresponds to one of a plurality of processing routines, the method comprising:
   assigning values in a control register to the plurality of processing routines, wherein each value indicates whether a given routine that is assigned to the value is enabled or disabled;
   wherein one or more of the plurality of processing routines is associated with a conditional jump instruction that is executed prior to execution of instructions from the corresponding processing routine;
   executing, by the processor, conditional lump instructions and in response to executing a first conditional jump instruction associated with a first processing routine, determining, by the processor, whether the value from the control register for the first processing routine indicates that the first processing routine is enabled or disabled; and
   (i) executing, by the processor, instructions of the first processing routine if the value from the control register indicates that the first processing routine is enabled and (ii) skipping the instructions of the first processing routine if the value from the control register indicates that the first processing routine is disabled.

9. The method of claim 8, wherein executing the first processing routine includes accessing program code of the first processing routine that is embodied in circuitry that is not re-programmable.

10. The method of claim 8, wherein executing the first processing routine includes accessing program code of the first processing routine when values in the control register enable a selected set of the features that includes the first processing routine.

11. The method of claim 8, wherein executing the plurality of processing routines includes accessing a portion of the processor that is designed onto a single mask layer.

12. The method of claim 8, wherein executing the first processing routine includes branching to a next processing routine of the plurality of processing routines and skipping the first processing routine when the value of the control register assigned to the first processing routine indicates that the first processing routine is not enabled.

13. The method of claim 8, wherein executing the plurality of processing routines is controlled based on the values in the control register assigned to a given routine to selectively activate a specified set of the features.

14. The method of claim 8, wherein determining whether the value of the control register indicates that the first processing routine is enabled includes accessing a defined location of the control register that corresponds with the first processing routine to analyze the value stored in the location, and wherein a program counter specifies a current location in the control register that corresponds with the first processing routine.

15. A processor, comprising:
- a memory embedded within the processor and storing a plurality of processing routines including instructions that are executable by the processor;
- a control register storing a set of values that i) each correspond to a different processing routine of the plurality of processing routines, and that ii) each value indicates whether a corresponding one of the plurality of processing routines is enabled or disabled;
- wherein one or more of the plurality of processing routines is associated with a conditional jump instruction that is executed prior to execution of the set of instructions of the corresponding processing routine;
- wherein each conditional jump instruction is configured to refer to a corresponding value in the control register that is assigned to the processing routine; and
- wherein upon the processor executing conditional jump instructions, the conditional jump instructions (i) control which instructions from the plurality of processing routines are executed based at least on the value from the control register indicating that a given routine is enabled, and (ii) control which instructions from the plurality of processing routines are skipped and not executed if the value from the control register indicates that a given routine is disabled.

16. The processor of claim 15, wherein the control register is further configured to be programmed with the set of values prior to the processor executing one or more of the plurality of processing routines.

17. The processor of claim 16, wherein the control register is fixed once initially programmed and is not re-programmable.

18. The processor of claim 15, further comprising:
- a processor engine configured to execute select ones of the plurality of processing routines according to which of the plurality of processing routines are enabled as indicated by the control register.

19. The processor of claim 15, wherein the memory is pre-programmed with the plurality of processing routines during a manufacturing process, and wherein the memory is fixed and not re-programmable.

20. The processor of claim 15, wherein the control register is indexed according to a value of a program counter that corresponds with the plurality of processing routines.

* * * * *